United States Patent
Li et al.

(10) Patent No.: US 9,261,921 B2
(45) Date of Patent: Feb. 16, 2016

(54) CARD EDGE CONNECTOR WITH MOVABLE EJECTOR

(71) Applicant: HON HAI PRECISION INDUSTRY CO., LTD., New Taipei (TW)

(72) Inventors: Zhuang-Xing Li, Kunshan (CN); Xue-Wu Bu, Kunshan (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/298,760

(22) Filed: Jun. 6, 2014

(65) Prior Publication Data

US 2014/0363994 A1 Dec. 11, 2014

(30) Foreign Application Priority Data

Jun. 6, 2013 (CN) ...................... 2013 2 0323796 U

(51) Int. Cl.
*G06F 1/18* (2006.01)
*H01R 12/70* (2011.01)
*H01R 12/72* (2011.01)

(52) U.S. Cl.
CPC .............. *G06F 1/18* (2013.01); *H01R 12/7029* (2013.01); *H01R 12/721* (2013.01)

(58) Field of Classification Search
USPC ........................... 439/160, 157, 153, 326, 328
See application file for complete search history.

(56) References Cited

U.S. PATENT DOCUMENTS

| | | | | |
|---|---|---|---|---|
| 4,898,540 A * | 2/1990 | Saito | | 439/153 |
| 5,302,133 A * | 4/1994 | Tondreault | | 439/157 |
| 5,443,394 A * | 8/1995 | Billman et al. | | 439/157 |
| 5,676,555 A * | 10/1997 | Yu et al. | | 439/157 |
| 5,746,614 A * | 5/1998 | Cheng et al. | | 439/157 |
| 6,113,404 A * | 9/2000 | Choy | | 439/160 |
| 6,132,228 A * | 10/2000 | Lang | | 439/160 |
| 6,319,027 B1 * | 11/2001 | Pickles et al. | | 439/157 |
| D463,384 S * | 9/2002 | Hu | | D13/199 |
| 6,599,142 B2 * | 7/2003 | Bu | | 439/157 |
| 6,616,466 B2 * | 9/2003 | Frantum et al. | | 439/157 |
| 7,494,354 B2 * | 2/2009 | Mon et al. | | 439/160 |
| D627,740 S * | 11/2010 | Wu et al. | | D13/154 |
| 7,828,566 B2 * | 11/2010 | Chen et al. | | 439/157 |
| 7,922,506 B1 * | 4/2011 | Harlan et al. | | 439/160 |
| 7,955,098 B1 * | 6/2011 | McKee et al. | | 439/157 |
| 8,002,563 B2 * | 8/2011 | Li et al. | | 439/160 |
| 8,052,335 B2 * | 11/2011 | Kasbeer-Betty et al. | | 385/92 |
| 8,070,499 B2 * | 12/2011 | Guan et al. | | 439/155 |
| 8,506,312 B2 * | 8/2013 | Li et al. | | 439/159 |
| 8,535,077 B2 * | 9/2013 | Shen et al. | | 439/328 |
| 8,616,903 B2 * | 12/2013 | Li et al. | | 439/157 |
| 8,794,985 B2 * | 8/2014 | Li et al. | | 439/157 |

* cited by examiner

*Primary Examiner* — Alexander Gilman
(74) *Attorney, Agent, or Firm* — Wei Te Chung; Ming Chieh Chang

(57) ABSTRACT

A card edge connector includes a longitudinal insulative housing (1) with tower portions (12) extending upwards, a plurality of contacts (2) retained in the insulative housing with contacting portions for contacting with the memory module and an ejector (4) pivoting between an opening station and a locking station. The tower portion defines a blocking portion (125) and a sliding recess (126) located on outside of the blocking portion for providing an enough sliding space for the ejector (4).

11 Claims, 4 Drawing Sheets

CARD EDGE CONNECTOR WITH MOVABLE EJECTOR

BACKGROUND OF THE INVENTION

1. Field of the Invention

The present invention relates to a card edge connector, and more particularly to a card edge connector with movable ejector.

2. Description of the Related Art

Card edge connector is usually assembled on a mother board and then engages with a daughter board for interconnecting between the two boards. U.S. Pat. No. 7,955,098 issued to Mckee et al. on Jun. 7, 2011, discloses a card edge connector having an insulative housing, a plurality of contacts retained in the insulative housing and a pair of ejectors moveably attached at the insulative housing. The insulative housing defines an inserting slot for receiving the daughter board and a pair of tower portions with receiving cavities for receiving the ejectors rotated therein between an opening station and a locking station. Each of the contacts includes a retaining portion retained in the sidewall, a contacting portion extending into the inserting slot from one end of the retaining portion for contacting with the daughter board and a soldering tail extending outwards to the insulative housing from another end of the retaining portion for connecting with and extending through the mother board. The ejector has a protruding portion engaging with a blocking portion provide by the tower portion for preventing the ejector from accidentally moving to the opening station. The tower portion includes a recess portion receiving the protruding portion therein for keeping the ejector located at the locking station.

However, because the ejector is repeatedly moved between the opening station and the locking station and engaging with inner side of the tower portion at a longer area, the protruding portion of the ejector is easily abrade and can not retain the ejector in the locking station steadily. So that the daughter board is easily pulled out and can not be locked.

Therefore, an improved card edge connector are desired to overcome the disadvantages of the related arts.

SUMMARY OF THE INVENTION

An object of the present invention is to provide a card edge connector with movable ejector having function of steadily locking memory card.

In order to achieve the above-mentioned object, a card edge connector in accordance with a preferred embodiment of the present invention includes a longitudinal insulative housing with tower portions extending upwards, a plurality of contacts retained in the insulative housing with contacting portions for contacting with the memory module and an ejector pivoting between an opening station and a locking station. The tower portion defines a blocking portion and a sliding recess located on outside of the blocking portion for providing an enough sliding space for the ejector.

Other objects, advantages and novel features of the invention will become more apparent from the following detailed description of the present embodiment when taken in conjunction with the accompanying drawings.

DETAILED DESCRIPTION OF THE INVENTION

Figure 1:
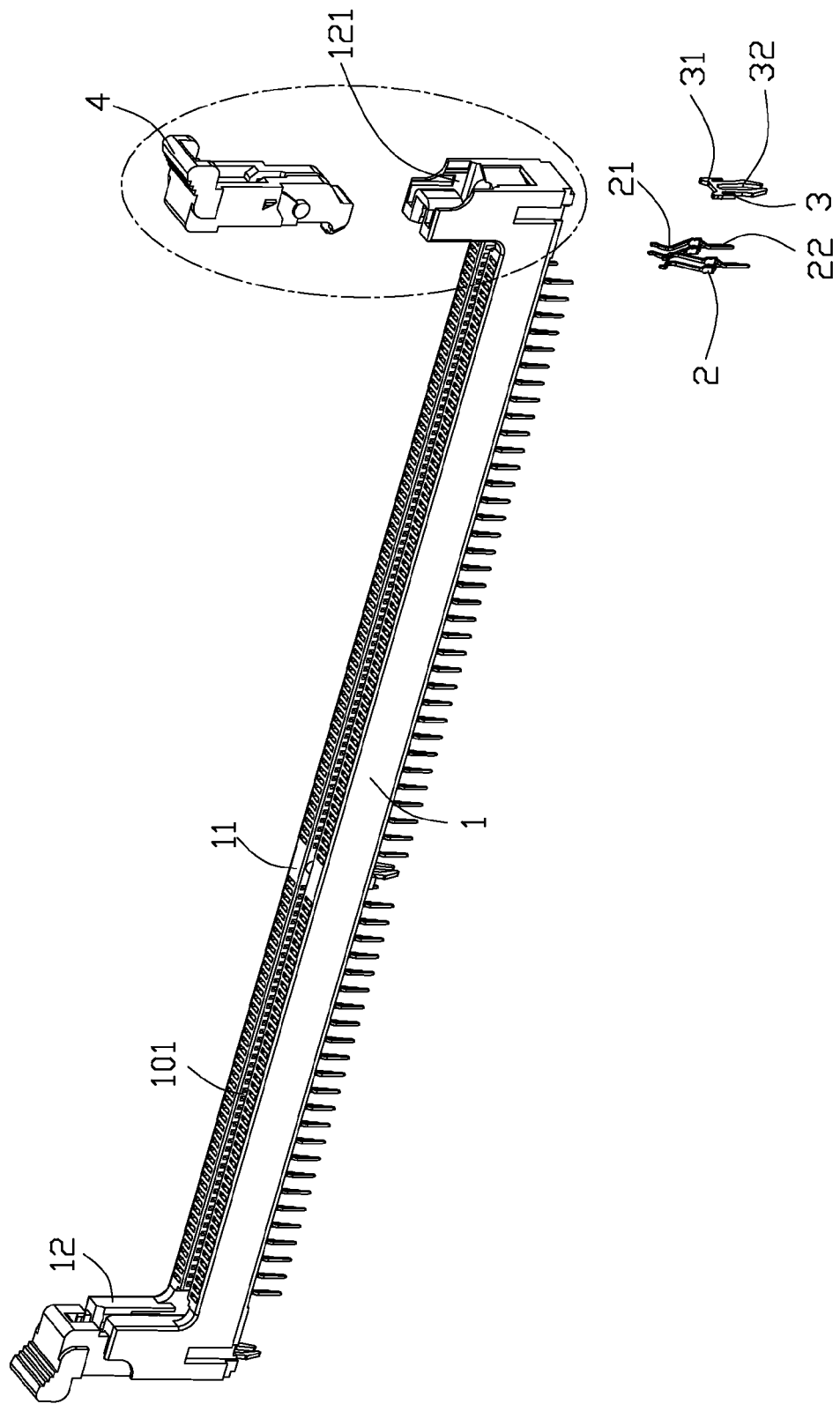
FIG. 1 is a perspective view of a card edge connector in accordance with the preferred embodiment of the present invention.

Reference will now be made to the drawing figures to describe the preferred embodiments of the present invention in detail.

Referring to FIG. 1, a card edge connector 100 for being mounted on a printed circuit board (i.e. PCB, not shown) and then engaging with a memory module (not shown) for interconnecting between both thereof is disclosed. The card edge connector 100 includes a longitudinal insulative housing 1, a plurality of contacts 2 retained in the insulative housing 1, a pair of board locks 3 retained on bottom of the insulative housing 1 for positioning the card edge connector 100 on the PCB and an ejector 4 pivotally engaging with the insulative housing 1.

Figure 2:
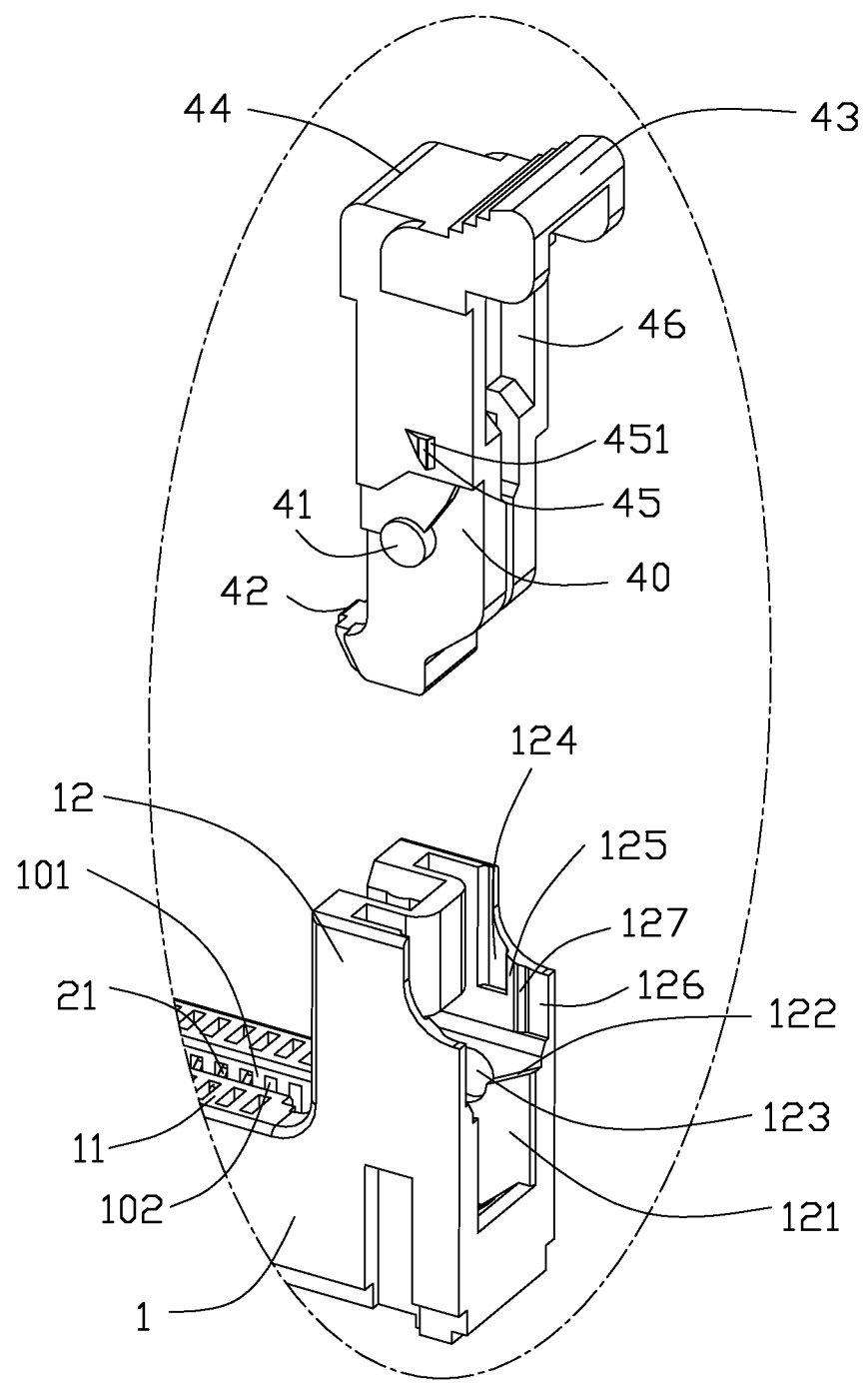
FIG. 2 is a partly enlarged view of the card edge connector shown in FIG. 1.

Referring to FIGS. 1 and 2, the insulative housing 1 includes a pair of longitudinal sidewalls 11 opposite to each other in a width direction thereof and a pair of tower portion 12 upwards integrally protruding from both ends of the sidewalls 11, thereby forming an inserting slot 101 for receiving the memory module. The insulative housing 1 defines a plurality of receiving grooves 102 for receiving the contacts 2 therein. The contacts 2 are arranged two arrays along a longitudinal direction, while opposite to each other in the width direction, respectively being disposed at both sidewalls 11. Each of the contacts 2 includes a contacting portion 21 extending into the inserting slot 101 for contacting with the memory module and a soldering tail 22 extending outwards from the contacting portion 21 for being soldered to the PCB.

The tower portion 12 has a receiving opening 121 for receiving the ejector 4 and a guiding portion 122 guiding the ejector 4 mounted into the receiving opening 121 and a pivoting hole 123 providing a pivoting point of support for the ejector 4. The ejector 4 is mounted into the receiving opening 121 and includes a body portion 40, a pair of rotating shafts 41 protruding from both sides of the body portion 40, an pushing portion 42 extending towards the insertion slot 101 from bottom end of the body portion 40 for pushing outwardly the memory module, an operating portion 43 extending from a top end of the body portion 40 and a locking portion 44 extending towards the insertion slot 101 and opposite to the operating portion 43 for locking the memory module.

The operating portion 43 is turned and drives the ejector 4 moving between an opening station in which the memory module is permitted into and a locking station in which the memory module is locked by the ejector 4. In an insertion process of the memory module, firstly, rotating outwards the ejector 4 to move in the opening station before the memory module is inserted into the insertion slot 101; secondly, inserting the memory module fully into the insertion slot 101; then rotating inwards the ejectors 3 to the locking station, here the locking portion 44 of the ejector 4 moves and meshes with a notch (not shown) formed by the memory module. In a withdrawing process of the memory module, the operating portion 43 is turned outwardly, and then the pushing portion 42 pushes the memory module leave the insertion slot 101. The guiding portion 122 could provide a support for the ejector 4 for preventing the ejector 4 opening overly.

The ejector 4 includes a protruding portion 45 protruded from the body portion 40 and blocking with both inner sides of the receiving opening 121. The body portion 40 of the ejector 4 further defines a stepped shape slot 46 for preventing the ejector 4 from deformation in forming process thereof and improving strength thereof. The tower portion 12 has a receiving recess 124 for receiving the protruding portion 45, a blocking portion 125 adjacent to outside of the receiving recess 124 along a longitudinal direction of the longitudinal insulative housing, a sliding recess 126 located on outside of the blocking portion 125 and a guiding area 127 formed between the sliding recess 126 and the blocking portion 125 for guiding the ejector 4 sliding and interferingly passing through the blocking portion 125.

In rotation process of the ejector 4 from the opening station to the locking station, the protruding portion 45 slides inwardly along the sliding recess 126, until it interferingly passes through the blocking portion 125 and get into the receiving recess 124. The sliding recess 126 provides an enough sliding space for the ejector 4, especially the sliding recess 126 is wider than the blocking portion 125 in the longitudinal direction, thereby decreasing an interfering area between the ejector 4 and the insulative housing 1 for reducing an interfering force therebetween and reducing abrasion of them. The protruding portion 45 is blocked by inner side of the blocking portion 125 and received in the receiving recess 124 for preventing the ejector 4 from opening accidentally when the ejector 4 is located in the locking station.

The protruding portion 45 forms a configuration of wedge shape and gets wider along the longitudinal direction, thereby the interfering force between thereboth increases along the protruding portion 45 interferingly passing through the blocking portion 125.

Figure 3:
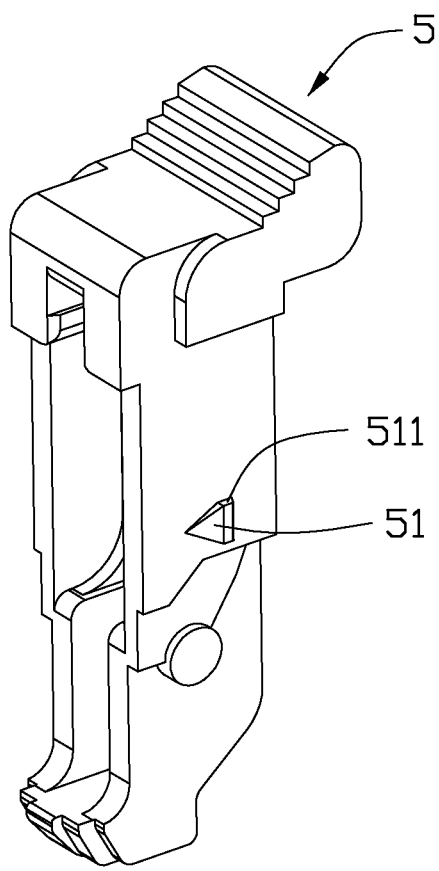
FIG. 3 is a perspective view of an ejector of the card edge connector in accordance with a second embodiment of the present invention.

Referring to FIG. 3, in a second embodiment, a protruding portion 51 formed by an ejector 5 is different from the protruding portion 45 in the first embodiment. The protruding portion 51 forms an isosceles triangle outline also for reducing impact and defines a platform portion 511 protruding at outermost side thereof for increasing the locking force of the ejector 5.

Figure 4:
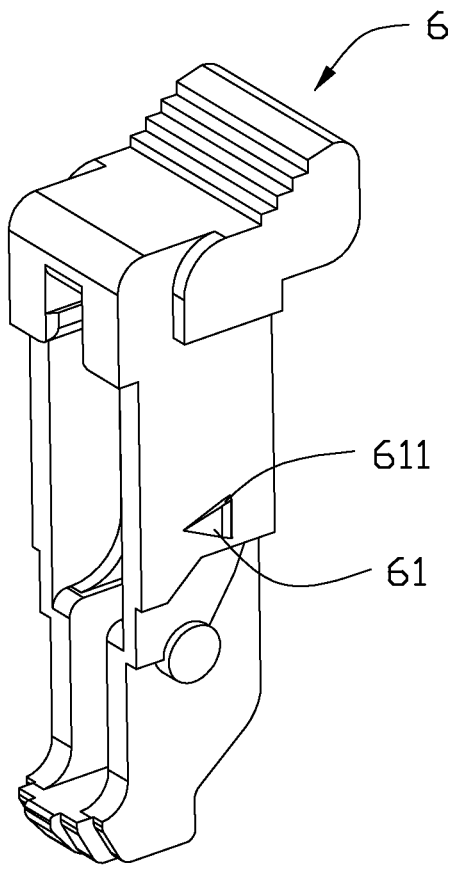
FIG. 4 is a perspective view of an ejector of the card edge connector in accordance with a third embodiment of the present invention.

Referring to FIG. 4, in a third embodiment, a protruding portion 61 formed by an ejector 6 is different from the protruding portion 51. The protruding portion 61 defines an arc-surfaced portion 611 protruding at outermost side thereof for easily sliding along the blocking portion 125.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the board general meaning of the terms in which the appended claims are expressed.

What is claimed is:

1. A card edge connector comprising:
a longitudinal insulative housing comprising a pair of sidewalls opposite to each other and a pair of tower portions upwards integrally protruding from both ends of the sidewalls, thereby forming an inserting slot for receiving a memory module;
a plurality of contacts retained in the insulative housing with contacting portions extending into the inserting slot for contacting with the memory module;
an ejector pivotally received in a receiving opening formed by the tower portion and moving between an opening station for permitting the memory module be inserted and a locking station for locking the memory module, and the ejector comprising a body portion and a protruding portion protruding from the body portion and blocking with a corresponding inner side of the receiving opening;
wherein the tower portion comprises a receiving recess for receiving the protruding portion, a blocking portion adjacent to outside of the receiving recess along a longitudinal direction and a sliding recess located on outside of the blocking portion; wherein
the sliding recess forms a sufficient space to receive the protruding portion therein without interference, and said sliding recess is wider than the blocking portion to decrease an interference range between the ejector and the housing; wherein
the tower portion comprises a guiding area formed between the sliding recess and the blocking portion for guiding the ejector sliding and passing through the blocking portion.

2. The card edge connector as described in claim 1, wherein in rotation process of the ejector from the opening station to the locking station, the protruding portion slides inwardly along the sliding recess, until it interferingly passes through the blocking portion and get into the receiving recess.

3. The card edge connector as described in claim 2, wherein the protruding portion is blocked by the blocking portion and received in the receiving recess when the ejector is located in the locking station.

4. The card edge connector as described in claim 2, wherein the protruding portion forms a configuration of wedge shape and gets wider along the longitudinal direction.

5. The card edge connector as described in claim 4, wherein the protruding portion comprises a platform portion protruding at outermost side thereof.

6. The card edge connector as described in claim 4, wherein the protruding portion comprises an arc-surfaced portion protruding at outermost side thereof for easily sliding along the blocking portion.

7. A card edge connector comprising:
a longitudinal insulative housing comprising a pair of sidewalls opposite to each other and a pair of tower portions upwards integrally protruding from both ends of the sidewalls;
a plurality of contacts retained in the insulative housing;
an ejector pivotally received in a receiving opening formed by the tower portion and moving between an opening station for permitting the memory module be inserted and a locking station for locking the memory module, and the ejector comprising a body portion and a protruding portion protruded from the body portion blocking with both inner sides of the receiving opening;
wherein the tower portion comprises a sliding recess providing an enough sliding space for the ejector and a blocking portion adjacent to the sliding recess, and in a rotation process of the ejector from the opening station to the locking station, the protruding portion slides inwardly along the sliding recess, until it interferingly passes through the blocking portion, thereby being blocked by inner side of the blocking portion for being positioned in the locking station; wherein
the sliding recess is wider than the blocking portion in a longitudinal direction, thereby decreasing an interfering area between the ejector and the insulative housing; wherein the tower portion comprises a guiding area formed between the sliding recess and the blocking portion for guiding the ejector sliding and interferingly passing through the blocking portion.

8. The card edge connector as described in claim 7, wherein the protruding portion forms a configuration of wedge shape and gets wider along the longitudinal direction.

9. A card edge connector comprising:

an elongated insulative housing having a center receiving slot extending along a longitudinal direction;

a plurality of contacts disposed in the housing and by two sides of the receiving slot;

a pair of tower portions located at two opposite ends of the housing in said longitudinal direction, each of said tower portions forming a receiving opening, a pair of receiving recesses respectively located by two sides of the receiving opening in a transverse direction perpendicular to said longitudinal direction, and a pair of sliding recesses respectively located by two sides of the receiving opening in the transverse direction and at an outer side with regard to the corresponding receiving recesses in the longitudinal direction;

a pair of ejectors respectively located within the corresponding receiving opening, each of said ejectors forming two opposite pivots rotatably secured to the corresponding tower portion, and a pair of protrusions located above the corresponding pivots and moveably retained in either the receiving recess or the sliding recess mutually exclusively; wherein each of said protrusions defines a triangular configuration in a side view along said transverse direction and a wedged configuration in a top view along a vertical direction perpendicular to both said longitudinal direction and said transverse direction; wherein on each side of the receiving opening, a blocking portion is formed between the corresponding receiving recess and the corresponding sliding recess in the longitudinal direction; wherein each sliding recess is formed by a vertical plane extending along said longitudinal direction and a vertical guiding area located proximate the blocking portion and extending oblique to both said longitudinal direction and said transverse direction; wherein said sliding recess forms a sufficient space to receive the corresponding protruding portion without interference, and a dimension of said sliding recess in said longitudinal direction is larger than that of the blocking portion in said longitudinal direction to decrease interference range between the ejector and the housing during rotation of the ejector.

10. The card edge connector as claimed in claim 9, wherein said triangular configuration defines an apex at an innermost position than any other portions in the longitudinal direction when said ejector is moved to a locking position where the protrusion is received in the receiving recess.

11. The card edge connector as claimed in claim 9, wherein the wedged configuration defines an inner tapered section and an outer parallel section with regard to a corresponding exterior surface from which the protrusion is formed.

* * * * *